(12) United States Patent
Belling et al.

(10) Patent No.: US 11,564,154 B2
(45) Date of Patent: Jan. 24, 2023

(54) APPARATUS, METHOD AND COMPUTER PROGRAM RELATED TO INFORMATION ABOUT SCP(S) AND SEPP(S) STORED IN NRF

(71) Applicant: NOKIA TECHNOLOGIES OY, Espoo (FI)

(72) Inventors: Horst Thomas Belling, Erding (DE); Georgios Gkellas, Petroupoli (GR); Devaki Chandramouli, Plano, TX (US); Saurabh Khare, Bangalore (IN); Laurent Thiebaut, Antony (FR); Bruno Landais, Pleumeur-Bodou (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 22 days.

(21) Appl. No.: 17/205,926

(22) Filed: Mar. 18, 2021

(65) Prior Publication Data
US 2021/0297935 A1    Sep. 23, 2021

(30) Foreign Application Priority Data

Mar. 23, 2020 (IN) .............................. 202041012618

(51) Int. Cl.
*H04W 48/16* (2009.01)
*H04W 48/18* (2009.01)
*H04W 60/00* (2009.01)
*H04W 88/18* (2009.01)

(52) U.S. Cl.
CPC ........... *H04W 48/16* (2013.01); *H04W 48/18* (2013.01); *H04W 60/00* (2013.01); *H04W 88/182* (2013.01)

(58) Field of Classification Search
CPC ..... H04W 48/16; H04W 48/18; H04W 60/00; H04W 88/182; H04W 40/00; H04L 45/00; H04L 63/0281; H04L 67/56; H04L 67/1097; H04L 67/10; H04L 67/60
See application file for complete search history.

(56) References Cited

U.S. PATENT DOCUMENTS

| 11,323,413 | B2 * | 5/2022 | Goel ........................ H04L 61/10 |
| 2020/0228613 | A1 | 7/2020 | Han | |
| 2021/0243678 | A1 * | 8/2021 | Drevon .................. H04W 48/02 |

(Continued)

FOREIGN PATENT DOCUMENTS

| EP | 3 866 559 A1 | 8/2021 |
| WO | WO 2019/062596 A1 | 4/2019 |

OTHER PUBLICATIONS

Huawei et al., "Deployment Option for User Identity to UDM/UDR/AUSF/PCF and IMS-HSS Resolution", 3GPP TSG-SA WG2 Meeting #131, S2-1901977, (Feb. 25-Mar. 1, 2019), 5 pages.

(Continued)

*Primary Examiner* — Julio R Perez
(74) *Attorney, Agent, or Firm* — Alston & Bird LLP

(57) ABSTRACT

There is provided an apparatus that comprises means for receiving a request from a second network function including information relating to the second network function, determining, based on the information relating to the second network function, at least one proxy function and in response to the request, providing to the second network function information relating to the at least one determined proxy function.

19 Claims, 7 Drawing Sheets

(56) References Cited

U.S. PATENT DOCUMENTS

2021/0258797 A1* 8/2021 Chandramouli ...... H04L 9/0838
2021/0258817 A1* 8/2021 Kolding ................ H04W 28/06

OTHER PUBLICATIONS

Nokia et al., "Inter-PLMN Communication using 3GPP-Sbi-Target-apiRoot", 3GPP TSG-CT WG4 Meeting #96, C4-201051, (Feb. 24-28, 2020), 15 pages.
Extended European Search Report for European Application No. 21162717.9 dated Aug. 30, 2021, 18 pages.
"3rd Generation Partnership Project; Technical Specification Group Core Network and Terminals; 5G System; Network Function Repository Services; Stage 3 (Release 16)", 3GPP TS 29.510 v16.2.0 (Dec. 2019), 167 pages.
"3rd Generation Partnership Project; Technical Specification Group Services and System Aspects; System Architecture for the 5G System (5GS); Stage 2 (Release 16)", 3GPP TS 23.501 v16.3.0, (Dec. 2019), 417 pages.
Ericsson et al., "SCP Selection of Another SCP", 3GPP TSG-SA/WG2 Meeting #137E, S2-2001850 (Feb. 24-27, 2020), 5 pages.
Ericsson et al., "SCP Selection of Another SCP", 3GPP TSG-SA/WG2 Meeting #137E, S2-2001851 (Feb. 24-27, 2020), 3 pages.
Huawei et al., "eSBA NF Registration via SCP", 3GPP TSG-SA WG2 Meeting #131, S2-1902781, (Feb. 25-Mar. 1, 2019), 4 pages.
Samsung, "Support of eSBA Features with SCP", SA WG2 Meeting #S2-137E e-meeting, S2-2002236 (Feb. 24-27, 2020), 3 pages.
Tencent, "Update of SCP Description to Support Distributed Deployment", SA WG2 Meeting #137E (e-meeting), S2-2002252 (Feb. 24-27, 2020), 2 pages.

* cited by examiner

APPARATUS, METHOD AND COMPUTER PROGRAM RELATED TO INFORMATION ABOUT SCP(S) AND SEPP(S) STORED IN NRF

CROSS-REFERENCE TO RELATED APPLICATIONS

This application claims priority to Indian Patent Application No. 202041012618, filed Mar. 23, 2020, the entire contents of which are incorporated herein by reference.

FIELD

The present application relates to a method, apparatus, system and computer program and in particular but not exclusively to information about Service Communication Proxy(ies) (SCP) and Security Edge Protection Proxy(ies) (SEPP) stored in the Network Repository Function (NRF).

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

In a first aspect there is provided an apparatus at a first network function comprising means for receiving a request from a second network function including information relating to the second network function, determining, based on the information relating to the second network function, at least one proxy function and, in response to the request, providing to the second network function information relating to the at least one determined proxy function.

The request from the second network function may be a request to discover at least one instances of sets of a target network function of a specific type or of a target service. The at least one determined proxy function may be a proxy function to address by the second network function for contacting the at least one instances of sets of the target network function or of the target service.

The response to the request may comprise information relating to the at least one sets or instances of the target network function or of the target service. The information relating to the at least one proxy function may comprise information that associates each at least one proxy function with one or more of the at least one sets or instances of the target network function or of the target service.

The request from the second network function may be a request to discover at least one proxy function.

The at least one proxy function may comprise at least one proxy function serving the second network function or at least one proxy function associated with a target network function or with a target service.

The apparatus may comprise means for receiving a registration request from the at least one proxy function comprising at least part of the information relating to the at least one proxy function and storing the information relating to the at least one proxy function.

The information relating to the second network function may comprise the type of the second network function, the locality of the second network function, the identity of the second network function or the network slice of the second network function.

The apparatus may comprise means for sending a registration request for the at least one proxy function including information relating to the at least one proxy function to a third network function.

The apparatus may comprise means for receiving, from a fourth network function, a registration request for at least one proxy function including information relating to the at least one proxy function and storing the information relating to the at least one proxy function.

The first network function may be a network repository function.

The third network function may be a network repository function.

The fourth network function may be a network repository function.

The second network function may comprise a network function instance or service instance or a proxy function.

The proxy function may comprise a service communication proxy, SCP.

The information relating to the proxy function may comprise at least one of at least one SCP address, at least one fully qualified domain name, SCP identity and status, priority, capacity, load, locality of SCP, deployment string for the apiRoot, responsibility of the SCP, and features supported by the SCP.

The responsibility of the SCP may comprise at least one of Service names of services of NFs served by the SCP, Served Location(s), service scope(s), locality/ies, Remote PLMN and/or non-public network identifiers, S-NSSAI(s) and/or NSI lists of the NFs, NF types, Domains, NF sets served by the SCP, information about other SCPs and/or SEPPS reachable via the SCP, information whether the SCP is the serving SCP of the second network function.

The responsibility of the SCP may be configured information in the apparatus.

The responsibility of the SCP may depend on the location of the second network function. The apparatus may comprise means for: storing different responsibility information for the SCP for different locations.

The apparatus may comprise means for receiving a registration or heartbeat request from a fifth network function, determining based on the stored responsibility information of an SCP that the SCP is serving the fifth network function, and providing information about the SCP in the reply to the registration or heartbeat request.

The proxy function may be a security edge protection proxy, SEPP.

The information relating to the proxy function comprises at least one of at least one SEPP address, a fully qualified domain name, SEPP identity and status, at least one public land mobile network identity or non-public network accessible through the SEPP, heartbeat timer, priority, capacity, load, sNssais/nsiList, features supported by the SEPP and locality.

The SEPP may be located in the same network as the second network function and the target network function or the target service may be located in another network accessible through the SEPP.

In a second aspect, there is provided an apparatus at a second network function comprising means for sending a first request to a first network function including information relating to the second network function, in response to the first request, receiving from the first network function information relating to at least one proxy function, determining to send a second request for a set or an instance of a target network function or of a target service towards a proxy function, selecting from the at least one proxy function a proxy function and sending the second request towards the selected proxy function.

The first request may be a request to discover at least one instances of sets of a target network function of a specific type or of a target service. The at least one proxy function may be a proxy function to address by the second network function for contacting the at least one instance of sets of the target network function or of the target service.

The response to the first request may comprise information relating to at least one sets or instances of the target network function or of the target service. The information relating to the at least one proxy function may comprise information that associates each proxy function with at least one of the one or several sets or instances of the target network function or of the target service.

The first request may be a request to discover at least one proxy function. The apparatus may comprise means for storing the at least one proxy functions received in response to the first request and selecting out of the received at least one proxy functions at least one proxy function for contacting one or several instances of sets of the target network function or of the target service.

The information relating to the second network function may comprise the type of the second network function, the locality of the second network function, the identity of the second network function or the network slice of the second network function.

The first network function may be a network repository function.

The second request may comprise an "authority" HTTP/2 pseudo-header field set to an address of the selected proxy function.

The second request may comprise an apiRoot of a request uniform resource identifier, URI, set to the address and deployment string for the apiRoot of the selected proxy function.

The second request may comprise a field indicating one or several proxy functions to be addressed as next hop by the selected proxy function.

The second network function may comprise a network function instance or a service instance The at least one proxy function may comprise at least one proxy function serving the second network function or at least one proxy function associated with a target network function or with a target service.

The second network function may be a proxy function.

The apparatus may comprise means for sending a registration request from the proxy function to the first network function comprising at least part of the information relating to the proxy function.

The apparatus may comprise means for receiving a service request for the target network function or for the target service and forwarding the service request as the second request.

The apparatus may comprise means for receiving, as part of the received service request, a field indicating one or several proxy functions to be addressed as next hop, and sending the service request towards one of the proxy functions indicated in the field.

The apparatus may comprise means for receiving, as part of the received service request, a field indicating the number of redirects by proxy functions and providing the field in the second request with an incremented value if the field is received with a value below a threshold value, providing the field in the second request with a start value if the field is not received, and dropping the received service request if the field is received including with a value exceeding the threshold value, The apparatus may comprise means for receiving as part of the received service request an 3gpp-Sbi-Target-apiRoot header, and retaining 3gpp-Sbi-Target-apiRoot header in the second request.

The apparatus may comprise means for storing the selected network function to which the apparatus sends the second service request in combination with the 3gpp-Sbi-Target-apiRoot header value, and sending subsequent received service request with the stored 3gpp-Sbi-Target-apiRoot header value toward the stored associated selected network function.

The apparatus may comprise means for receiving, as part of the received service request, discovery parameters, selecting discovery parameters to be retained in the second service request if the apparatus selects to send the second request towards a proxy function, and removing the discovery parameters if the apparatus selects not to send the second request towards a proxy function.

The proxy function may comprise a service communication proxy, SCP.

The information relating to the proxy function may comprise at least one of at least one SCP address, at least one fully qualified domain name, SCP identity and status, priority, capacity, load, locality of SCP, deployment string for the apiRoot, responsibility of the SCP, and features supported by the SCP.

The responsibility of the SCP may comprise at least one of Service names of services provided by NFs served by the SCP, Served Location(s), service scope(s), locality/ies, Remote PLMN and/or non-public network identifiers, S-NSSAI(s) and/or NSI lists of the NFs served by the, NF types, Domains, NF sets served by the SCP, information about other SCPs and/or SEPPS reachable via the SCP, information whether the SCP is the serving SCP of the second network function.

The proxy function may be a security edge protection proxy, SEPP.

The information relating to the proxy function may comprise at least one of at least one SEPP address, a fully qualified domain name, SEPP identity and status, at least one public land mobile network identity or non-public network accessible through the SEPP, heartbeat timer, priority, capacity, load, sNssais/nsiList, features supported by the SEPP and locality.

The SEPP may be located in the same network as the second network function and the target network function or the target service is located in another network accessible through the SEPP.

In a third aspect there is provided a method comprising receiving a request from a second network function including information relating to the second network function, determining, based on the information relating to the second network function, at least one proxy function and, in response to the request, providing to the second network function information relating to the at least one determined proxy function.

The request from the second network function may be a request to discover at least one instances of sets of a target network function of a specific type or of a target service. The at least one determined proxy function may be a proxy function to address by the second network function for contacting the at least one instances of sets of the target network function or of the target service.

The response to the request may comprise information relating to the at least one sets or instances of the target network function or of the target service. The information relating to the at least one proxy function may comprise information that associates each at least one proxy function with one or more of the at least one sets or instances of the target network function or of the target service.

The request from the second network function may be a request to discover at least one proxy function.

The at least one proxy function may comprise at least one proxy function serving the second network function or at least one proxy function associated with a target network function or with a target service.

The method may comprise receiving a registration request from the at least one proxy function comprising at least part of the information relating to the at least one proxy function and storing the information relating to the at least one proxy function.

The information relating to the second network function may comprise the type of the second network function, the locality of the second network function, the identity of the second network function or the network slice of the second network function.

The method may comprise sending a registration request for the at least one proxy function including information relating to the at least one proxy function to a third network function.

The method may comprise receiving, from a fourth network function, a registration request for at least one proxy function including information relating to the at least one proxy function and storing the information relating to the at least one proxy function.

The first network function may be a network repository function.

The third network function may be a network repository function.

The fourth network function may be a network repository function.

The second network function may comprise a network function instance or service instance or a proxy function.

The proxy function may comprise a service communication proxy, SCP.

The information relating to the proxy function may comprise at least one of at least one SCP address, at least one fully qualified domain name, SCP identity and status, priority, capacity, load, locality of SCP, deployment string for the apiRoot, responsibility of the SCP, and features supported by the SCP.

The responsibility of the SCP may comprise at least one of Service names of services of NFs served by the SCP, Served Location(s), service scope(s), locality/ies, Remote PLMN and/or non-public network identifiers, S-NSSAI(s) and/or NSI lists of the NFs, NF types, Domains, NF sets served by the SCP, information about other SCPs and/or SEPPS reachable via the SCP, information whether the SCP is the serving SCP of the second network function.

The responsibility of the SCP may be configured information in the apparatus.

The responsibility of the SCP may depend on the location of the second network function. The method may comprise storing different responsibility information for the SCP for different locations.

The method may comprise receiving a registration or heartbeat request from a fifth network function, determining based on the stored responsibility information of an SCP that the SCP is serving the fifth network function, and providing information about the SCP in the reply to the registration or heartbeat request.

The proxy function may be a security edge protection proxy, SEPP.

The information relating to the proxy function comprises at least one of at least one SEPP address, a fully qualified domain name, SEPP identity and status, at least one public land mobile network identity or non-public network accessible through the SEPP, heartbeat timer, priority, capacity, load, sNssais/nsiList, features supported by the SEPP and locality.

The SEPP may be located in the same network as the second network function and the target network function or the target service may be located in another network accessible through the SEPP.

In a fourth aspect there is provided a method comprising sending a first request to a first network function including information relating to the second network function, in response to the first request, receiving from the first network function information relating to at least one proxy function, determining to send a second request for a set or an instance of a target network function or of a target service towards a proxy function, selecting from the at least one proxy function a proxy function and sending the second request towards the selected proxy function.

The first request may be a request to discover at least one instance of sets of a target network function of a specific type or of a target service. The at least one proxy function may be a proxy function to address by the second network function for contacting the at least one instances of sets of the target network function or of the target service.

The response to the first request may comprise information relating to at least one sets or instances of the target network function or of the target service. The information relating to the at least one proxy function may comprise information that associates each proxy function with at least one of the one or several sets or instances of the target network function or of the target service.

The first request may be a request to discover at least one proxy function. The method may comprise storing the at least one proxy functions received in response to the first request and selecting out of the received at least one proxy functions at least one proxy function for contacting one or several instances of sets of the target network function or of the target service.

The information relating to the second network function may comprise the type of the second network function, the locality of the second network function, the identity of the second network function or the network slice of the second network function.

The first network function may be a network repository function.

The second request may comprise an "authority" HTTP/2 pseudo-header field set to an address of the selected proxy function.

The second request may comprise an apiRoot of a request uniform resource identifier, URI, set to the address and deployment string for the apiRoot of the selected proxy function.

The second request may comprise a field indicating one or several proxy functions to be addressed as next hop by the selected proxy function.

The second network function may comprise a network function instance or a service instance.

The at least one proxy function may comprise at least one proxy function serving the second network function or at least one proxy function associated with a target network function or with a target service.

The second network function may be a proxy function.

The method may comprise sending a registration request from the proxy function to the first network function comprising at least part of the information relating to the proxy function.

The method may comprise receiving a service request for the target network function or for the target service and forwarding the service request as the second request.

The method may comprise receiving, as part of the received service request, a field indicating one or several proxy functions to be addressed as next hop, and sending the service request towards one of the proxy functions indicated in the field.

The method may comprise receiving, as part of the received service request, a field indicating the number of redirects by proxy functions and providing the field in the second request with an incremented value if the field is received with a value below a threshold value, providing the field in the second request with a start value if the field is not received, and dropping the received service request if the field is received including with a value exceeding the threshold value, The method may comprise receiving as part of the received service request an 3gpp-Sbi-Target-apiRoot header, and retaining 3gpp-Sbi-Target-apiRoot header in the second request.

The method may comprise storing the selected network function to which the apparatus sends the second service request in combination with the 3gpp-Sbi-Target-apiRoot header value, and sending subsequent received service request with the stored 3gpp-Sbi-Target-apiRoot header value toward the stored associated selected network function.

The method may comprise receiving, as part of the received service request, discovery parameters, selecting discovery parameters to be retained in the second service request if the apparatus selects to send the second request towards a proxy function, and removing the discovery parameters if the apparatus selects not to send the second request towards a proxy function.

The proxy function may comprise a service communication proxy, SCP.

The information relating to the proxy function may comprise at least one of at least one SCP address, at least one fully qualified domain name, SCP identity and status, priority, capacity, load, locality of SCP, deployment string for the apiRoot, responsibility of the SCP, and features supported by the SCP.

The responsibility of the SCP may comprise at least one of Service names of services provided by NFs served by the SCP, Served Location(s), service scope(s), locality/ies, Remote PLMN and/or non-public network identifiers, S-NS-SAI(s) and/or NSI lists of the NFs served by the, NF types, Domains, NF sets served by the SCP, information about other SCPs and/or SEPPS reachable via the SCP, information whether the SCP is the serving SCP of the second network function.

The proxy function may be a security edge protection proxy, SEPP.

The information relating to the proxy function may comprise at least one of at least one SEPP address, a fully qualified domain name, SEPP identity and status, at least one public land mobile network identity or non-public network accessible through the SEPP, heartbeat timer, priority, capacity, load, sNssais/nsiList, features supported by the SEPP and locality.

The SEPP may be located in the same network as the second network function and the target network function or the target service is located in another network accessible through the SEPP.

In a fifth aspect there is provided an apparatus at a first network function comprising: at least one processor and at least one memory including a computer program code, the at least one memory and computer program code configured to, with the at least one processor, cause the apparatus at least to receive a request from a second network function including information relating to the second network function, determine, based on the information relating to the second network function, at least one proxy function and in response to the request, provide to the second network function information relating to the at least one determined proxy function.

The request from the second network function may be a request to discover at least one instances of sets of a target network function of a specific type or of a target service. The at least one determined proxy function may be a proxy function to address by the second network function for contacting the at least one instances of sets of the target network function or of the target service.

The response to the request may comprise information relating to the at least one sets or instances of the target network function or of the target service. The information relating to the at least one proxy function may comprise information that associates each at least one proxy function with one or more of the at least one sets or instances of the target network function or of the target service.

The request from the second network function may be a request to discover at least one proxy function.

The at least one proxy function may comprise at least one proxy function serving the second network function or at least one proxy function associated with a target network function or with a target service.

The apparatus may be caused to receive a registration request from the at least one proxy function comprising at least part of the information relating to the at least one proxy function and storing the information relating to the at least one proxy function.

The information relating to the second network function may comprise the type of the second network function, the locality of the second network function, the identity of the second network function or the network slice of the second network function.

The apparatus may be caused to send a registration request for the at least one proxy function including information relating to the at least one proxy function to a third network function.

The apparatus may be caused to receive, from a fourth network function, a registration request for at least one proxy function including information relating to the at least one proxy function and storing the information relating to the at least one proxy function.

The first network function may be a network repository function.

The third network function may be a network repository function.

The fourth network function may be a network repository function.

The second network function may comprise a network function instance or service instance or a proxy function.

The proxy function may comprise a service communication proxy, SCP.

The information relating to the proxy function may comprise at least one of at least one SCP address, at least one fully qualified domain name, SCP identity and status, priority, capacity, load, locality of SCP, deployment string for the apiRoot, responsibility of the SCP, and features supported by the SCP.

The responsibility of the SCP may comprise at least one of Service names of services of NFs served by the SCP, Served Location(s), service scope(s), locality/ies, Remote PLMN and/or non-public network identifiers, S-NSSAI(s) and/or NSI lists of the NFs, NF types, Domains, NF sets served by the SCP, information about other SCPs and/or SEPPS reachable via the SCP, information whether the SCP is the serving SCP of the second network function.

The responsibility of the SCP may be configured information in the apparatus.

The responsibility of the SCP may depend on the location of the second network function. The apparatus may be caused to store different responsibility information for the SCP for different locations.

The apparatus may be caused to receive a registration or heartbeat request from a fifth network function, determining based on the stored responsibility information of an SCP that the SCP is serving the fifth network function, and providing information about the SCP in the reply to the registration or heartbeat request.

The proxy function may be a security edge protection proxy, SEPP.

The information relating to the proxy function comprises at least one of at least one SEPP address, a fully qualified domain name, SEPP identity and status, at least one public land mobile network identity or non-public network accessible through the SEPP, heartbeat timer, priority, capacity, load, sNssais/nsiList, features supported by the SEPP and locality.

The SEPP may be located in the same network as the second network function and the target network function or the target service may be located in another network accessible through the SEPP.

In a sixth aspect there is provided an apparatus at a second network function comprising: at least one processor and at least one memory including a computer program code, the at least one memory and computer program code configured to, with the at least one processor, cause the apparatus at least to send a first request to a first network function including information relating to the second network function, in response to the first request, receive from the first network function information relate to at least one proxy function, determine to send a second request for a set or an instance of a target network function or of a target service towards a proxy function, select from the at least one proxy function a proxy function and send the second request towards the selected proxy function.

The first request may be a request to discover at least one instance of sets of a target network function of a specific type or of a target service. The at least one proxy function may be a proxy function to address by the second network function for contacting the at least one instances of sets of the target network function or of the target service.

The response to the first request may comprise information relating to at least one sets or instance of the target network function or of the target service. The information relating to the at least one proxy function may comprise information that associates each proxy function with at least one of the one or several sets or instances of the target network function or of the target service.

The first request may be a request to discover at least one proxy function. The apparatus may be caused to store the at least one proxy functions received in response to the first request and select out of the received at least one proxy functions at least one proxy function for contacting one or several instances of sets of the target network function or of the target service.

The information relating to the second network function may comprise the type of the second network function, the locality of the second network function, the identity of the second network function or the network slice of the second network function.

The first network function may be a network repository function.

The second request may comprise an "authority" HTTP/2 pseudo-header field set to an address of the selected proxy function.

The second request may comprise an apiRoot of a request uniform resource identifier, URI, set to the address and deployment string for the apiRoot of the selected proxy function.

The second request may comprise a field indicating one or several proxy functions to be addressed as next hop by the selected proxy function.

The second network function may comprise a network function instance or a service instance.

The at least one proxy function may comprise at least one proxy function serving the second network function or at least one proxy function associated with a target network function or with a target service.

The second network function may be a proxy function.

The apparatus may be caused to send a registration request from the proxy function to the first network function comprising at least part of the information relating to the proxy function.

The apparatus may be caused to receive a service request for the target network function or for the target service and forwarding the service request as the second request.

The apparatus may be caused to receive, as part of the received service request, a field indicating one or several proxy functions to be addressed as next hop, and send the service request towards one of the proxy functions indicated in the field.

The apparatus may be caused to receive, as part of the received service request, a field indicating the number of redirects by proxy functions and provide the field in the second request with an incremented value if the field is received with a value below a threshold value, provide the field in the second request with a start value if the field is not received, and drop the received service request if the field is received including with a value exceeding the threshold value, The apparatus may be caused to receive as part of the received service request an 3gpp-Sbi-Target-apiRoot header, and retaining 3gpp-Sbi-Target-apiRoot header in the second request.

The apparatus may be caused to store the selected network function to which the apparatus sends the second service request in combination with the 3gpp-Sbi-Target-apiRoot header value, and send subsequent received service request with the stored 3gpp-Sbi-Target-apiRoot header value toward the stored associated selected network function.

The apparatus may be caused to receive, as part of the received service request, discovery parameters, select discovery parameters to be retained in the second service request if the apparatus selects to send the second request towards a proxy function, and remove the discovery parameters if the apparatus selects not to send the second request towards a proxy function.

The proxy function may comprise a service communication proxy, SCP.

The information relating to the proxy function may comprise at least one of at least one SCP address, at least one fully qualified domain name, SCP identity and status, priority, capacity, load, locality of SCP, deployment string for the apiRoot, responsibility of the SCP, and features supported by the SCP.

The responsibility of the SCP may comprise at least one of Service names of services provided by NFs served by the SCP, Served Location(s), service scope(s), locality/ies, Remote PLMN and/or non-public network identifiers, S-NSSAI(s) and/or NSI lists of the NFs served by the, NF types, Domains, NF sets served by the SCP, information about other SCPs and/or SEPPS reachable via the SCP, information whether the SCP is the serving SCP of the second network function.

The proxy function may be a security edge protection proxy, SEPP.

The information relating to the proxy function may comprise at least one of at least one SEPP address, a fully qualified domain name, SEPP identity and status, at least one public land mobile network identity or non-public network accessible through the SEPP, heartbeat timer, priority, capacity, load, sNssais/nsiList, features supported by the SEPP and locality.

The SEPP may be located in the same network as the second network function and the target network function or the target service is located in another network accessible through the SEPP.

In a seventh aspect, there is provided a computer readable medium comprising program instructions for causing an apparatus at a first network function to perform at least the following receiving a request from a second network function including information relating to the second network function, determining, based on the information relating to the second network function, at least one proxy function; and in response to the request, providing to the second network function information relating to the at least one determined proxy function.

The request from the second network function may be a request to discover at least one instances of sets of a target network function of a specific type or of a target service. The at least one determined proxy function may be a proxy function to address by the second network function for contacting the at least one instances of sets of the target network function or of the target service.

The response to the request may comprise information relating to the at least one sets or instances of the target network function or of the target service. The information relating to the at least one proxy function may comprise information that associates each at least one proxy function with one or more of the at least one sets or instances of the target network function or of the target service.

The request from the second network function may be a request to discover at least one proxy function.

The at least one proxy function may comprise at least one proxy function serving the second network function or at least one proxy function associated with a target network function or with a target service.

The apparatus may be caused to perform receiving a registration request from the at least one proxy function comprising at least part of the information relating to the at least one proxy function and storing the information relating to the at least one proxy function.

The information relating to the second network function may comprise the type of the second network function, the locality of the second network function, the identity of the second network function or the network slice of the second network function.

The apparatus may be caused to perform sending a registration request for the at least one proxy function including information relating to the at least one proxy function to a third network function.

The apparatus may be caused to perform receiving, from a fourth network function, a registration request for at least one proxy function including information relating to the at least one proxy function and storing the information relating to the at least one proxy function.

The first network function may be a network repository function.

The third network function may be a network repository function.

The fourth network function may be a network repository function.

The second network function may comprise a network function instance or service instance or a proxy function.

The proxy function may comprise a service communication proxy, SCP.

The information relating to the proxy function may comprise at least one of at least one SCP address, at least one fully qualified domain name, SCP identity and status, priority, capacity, load, locality of SCP, deployment string for the apiRoot, responsibility of the SCP, and features supported by the SCP.

The responsibility of the SCP may comprise at least one of Service names of services of NFs served by the SCP, Served Location(s), service scope(s), locality/ies, Remote PLMN and/or non-public network identifiers, S-NSSAI(s) and/or NSI lists of the NFs, NF types, Domains, NF sets served by the SCP, information about other SCPs and/or SEPPS reachable via the SCP, information whether the SCP is the serving SCP of the second network function.

The responsibility of the SCP may be configured information in the apparatus.

The responsibility of the SCP may depend on the location of the second network function. The apparatus may be caused to perform storing different responsibility information for the SCP for different locations.

The apparatus may be caused to perform receiving a registration or heartbeat request from a fifth network function, determining based on the stored responsibility information of an SCP that the SCP is serving the fifth network function, and providing information about the SCP in the reply to the registration or heartbeat request.

The proxy function may be a security edge protection proxy, SEPP.

The information relating to the proxy function comprises at least one of at least one SEPP address, a fully qualified domain name, SEPP identity and status, at least one public land mobile network identity or non-public network accessible through the SEPP, heartbeat timer, priority, capacity, load, sNssais/nsiList, features supported by the SEPP and locality.

The SEPP may be located in the same network as the second network function and the target network function or the target service may be located in another network accessible through the SEPP.

In an eighth aspect there is provided a computer readable medium comprising program instructions for causing an apparatus at a second network function to perform at least the following sending a first request to a first network function including information relating to the second network function, in response to the first request, receiving from the first network function information relate to at least one proxy function, determining to send a second request for a set or an instance of a target network function or of a target service towards a proxy function, selecting from the at least one proxy function a proxy function and sending the second request towards the selected proxy function.

The first request may be a request to discover at least one instance of sets of a target network function of a specific type or of a target service. The at least one proxy function may be a proxy function to address by the second network function for contacting the at least one instances of sets of the target network function or of the target service.

The response to the first request may comprise information relating to at least one sets or instances of the target network function or of the target service. The information relating to the at least one proxy function may comprise information that associates each proxy function with at least one of the one or several sets or instances of the target network function or of the target service.

The first request may be a request to discover at least one proxy function. The apparatus may be caused to perform storing the at least one proxy functions received in response to the first request and selecting out of the received at least one proxy functions a proxy function for contacting one or several instances of sets of the target network function or of the target service.

The information relating to the second network function may comprise the type of the second network function, the locality of the second network function, the identity of the second network function or the network slice of the second network function.

The first network function may be a network repository function.

The second request may comprise an "authority" HTTP/2 pseudo-header field set to an address of the selected proxy function.

The second request may comprise an apiRoot of a request uniform resource identifier, URI, set to the address and deployment string for the apiRoot of the selected proxy function.

The second request may comprise a field indicating one or several proxy functions to be addressed as next hop by the selected proxy function.

The second network function may comprise a network function instance or a service instance The at least one proxy function may comprise at least one proxy function serving the second network function or at least one proxy function associated with a target network function or with a target service.

The second network function may be a proxy function.

The apparatus may be caused to perform sending a registration request from the proxy function to the first network function comprising at least part of the information relating to the proxy function.

The apparatus may be caused to perform receiving a service request for the target network function or for the target service and forwarding the service request as the second request.

The apparatus may be caused to perform receiving, as part of the received service request, a field indicating one or several proxy functions to be addressed as next hop, and sending the service request towards one of the proxy functions indicated in the field.

The apparatus may be caused to perform receiving, as part of the received service request, a field indicating the number of redirects by proxy functions and providing the field in the second request with an incremented value if the field is received with a value below a threshold value, providing the field in the second request with a start value if the field is not received, and dropping the received service request if the field is received including with a value exceeding the threshold value, The apparatus may be caused to perform receiving as part of the received service request an 3gpp-Sbi-Target-apiRoot header, and retaining 3gpp-Sbi-Target-apiRoot header in the second request.

The apparatus may be caused to perform storing the selected network function to which the apparatus sends the second service request in combination with the 3gpp-Sbi-Target-apiRoot header value, and sending subsequent received service request with the stored 3gpp-Sbi-Target-apiRoot header value toward the stored associated selected network function.

The apparatus may be caused to perform receiving, as part of the received service request, discovery parameters, selecting discovery parameters to be retained in the second service request if the apparatus selects to send the second request towards a proxy function, and removing the discovery parameters if the apparatus selects not to send the second request towards a proxy function.

The proxy function may comprise a service communication proxy, SCP.

The information relating to the proxy function may comprise at least one of at least one SCP address, at least one fully qualified domain name, SCP identity and status, priority, capacity, load, locality of SCP, deployment string for the apiRoot, responsibility of the SCP, and features supported by the SCP.

The responsibility of the SCP may comprise at least one of Service names of services provided by NFs served by the SCP, Served Location(s), service scope(s), locality/ies, Remote PLMN and/or non-public network identifiers, S-NSSAI(s) and/or NSI lists of the NFs served by the, NF types, Domains, NF sets served by the SCP, information about other SCPs and/or SEPPS reachable via the SCP, information whether the SCP is the serving SCP of the second network function.

The proxy function may be a security edge protection proxy, SEPP.

The information relating to the proxy function may comprise at least one of at least one SEPP address, a fully qualified domain name, SEPP identity and status, at least one public land mobile network identity or non-public network accessible through the SEPP, heartbeat timer, priority, capacity, load, sNssais/nsiList, features supported by the SEPP and locality.

The SEPP may be located in the same network as the second network function and the target network function or the target service is located in another network accessible through the SEPP.

In a ninth aspect there is provided a non-transitory computer readable medium comprising program instructions for causing an apparatus to perform at least the method according to the third or fourth aspect.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

Before explaining in detail the examples, certain general principles of a wireless communication system and mobile communication devices are briefly explained with reference to FIGS. 1 to 3 to assist in understanding the technology underlying the described examples.

Figure 1:
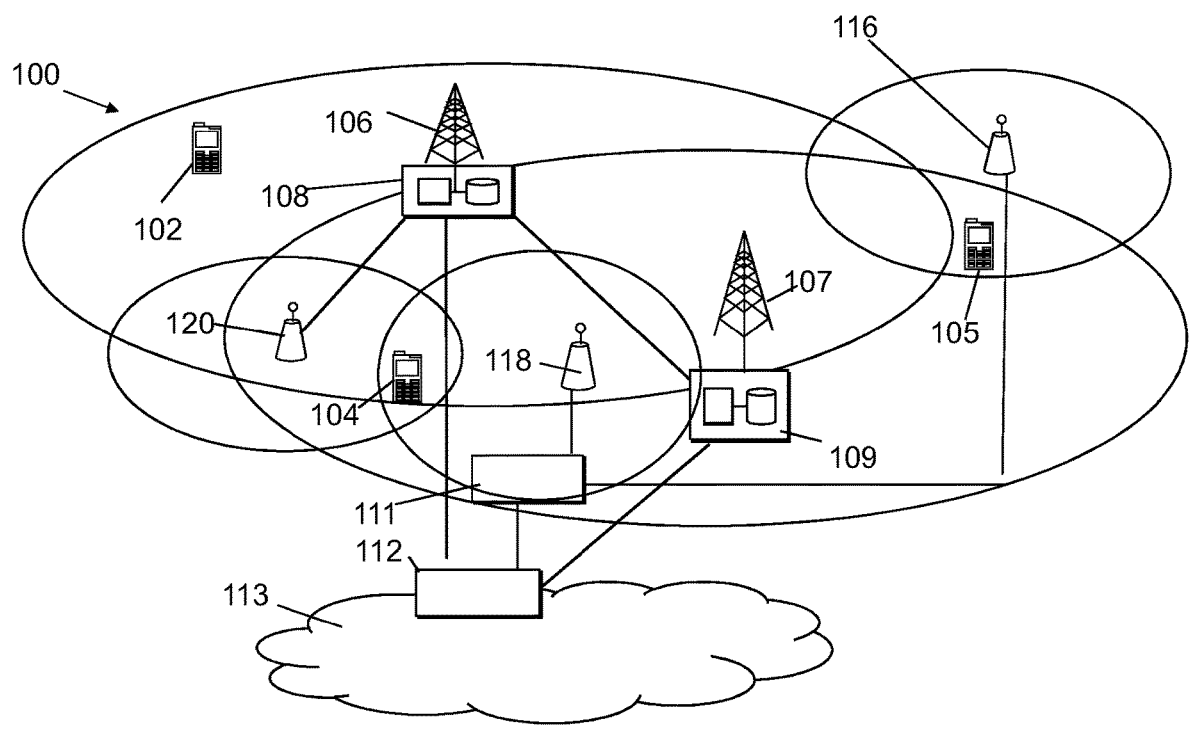
FIG. 1 shows a schematic diagram of an example communication system comprising a base station and a plurality of communication devices.

In a wireless communication system 100, such as that shown in FIG. 1, communication devices (e.g., user equipment (UE)) 102, 104, 105 are provided wireless access via at least one base station or similar wireless transmitting and/or receiving node or point. Base stations are typically controlled by at least one appropriate controller apparatus, so as to enable operation thereof and management of mobile communication devices in communication with the base stations. The controller apparatus may be located in a Radio Access Network (RAN) (e.g. wireless communication system 100) or in a core network (CN) (not shown) and may be implemented as one central apparatus or its functionality may be distributed over several apparatuses. The controller apparatus may be part of the base station and/or provided by a separate entity such as a radio network controller. In FIG. 1 control apparatus 108 and 109 are shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, base stations 116 and 118 are connected via a gateway 111 whilst base station 120 connects via the controller apparatus 108. In some embodiments, the smaller base stations may not be provided. Smaller base stations 116, 118 and 120 may be part of a second network, for example WLAN and may be WLAN Access Points (APs).

The communication devices 102, 104, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE (LTE-A) employs a radio mobile architecture known as the Evolved Universal Terrestrial Radio Access Network (E-UTRAN) and a core network known as the Evolved Packet Core (EPC). Base stations of such systems are known as evolved or enhanced Node Bs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN). A base station can provide coverage for an entire cell or similar radio service area. Core network elements may include at least Access and Mobility management Function (AMF), Session Management Function (SMF), User Plane Function (UPF) and Policy Control Function (PCF). Mechanisms described in the document are applicable regardless of the access technology used for the User Equipment to connect to the network (3GPP Radio technology such as NR, non 3GPP Radio technology as defined by IEEE, satellite access, wireline access etc.).

An example of a suitable communications system is the 5G or NR concept. Network architecture in NR may be similar to that of LTE-advanced. Base stations of NR systems may be known as next generation Node Bs (gNBs). Changes to the network architecture may depend on the need to support various radio technologies and finer QoS support, and some on-demand requirements for e.g. Quality of Service (QoS) levels to support Quality of Experience (QoE) for a user. Also network aware services and applications, and service and application aware networks may bring changes to the architecture. Those are related to Information Centric Network (ICN) and User-Centric Content Delivery Network (UC-CDN) approaches. NR may use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

Future networks may utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Figure 2:
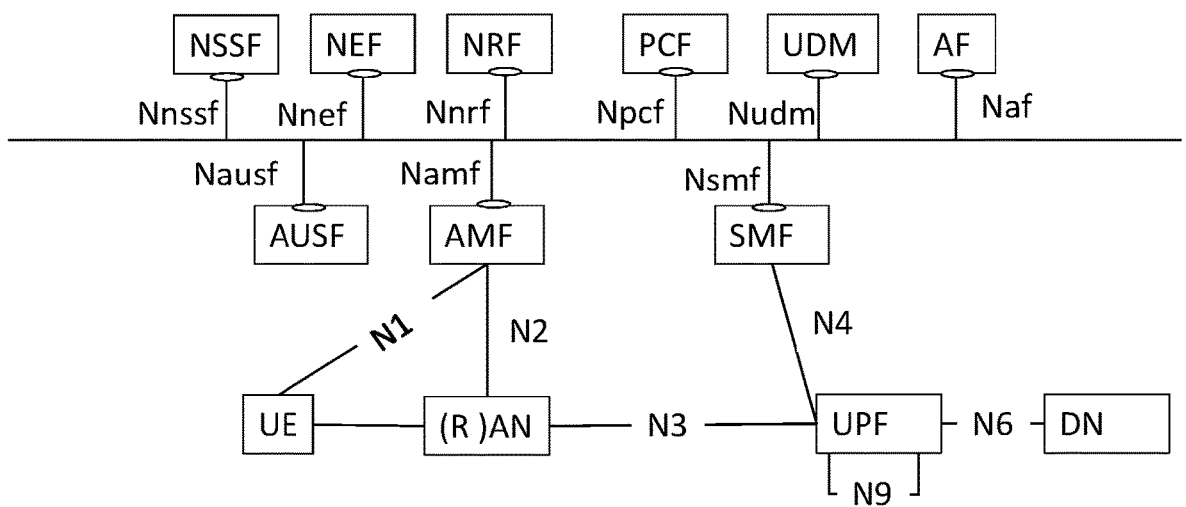
FIG. 2 shows a schematic diagram of an example 5GS architecture.

An example architecture for a 5G core network (CN) is shown in FIG. 2. An example 5G CN comprises functional entities. The CN is connected to a UE via the radio access network (RAN). A User Plane Function (UPF) whose role is called PDU Session Anchor (PSA) may be responsible for forwarding frames back and forth between the data network (DN) and the tunnels established over the 5G towards the UE(s) exchanging traffic with the DN.

The UPF is controlled by a Session Management Function (SMF) that receives policies from a Policy Control Function (PCF). The CN may also include an Access & Mobility Function (AMF).

A Network Repository Function (NRF), provides network function (NF) service registration and discovery, enabling NFs to identify appropriate services in one another.

Figure 3:
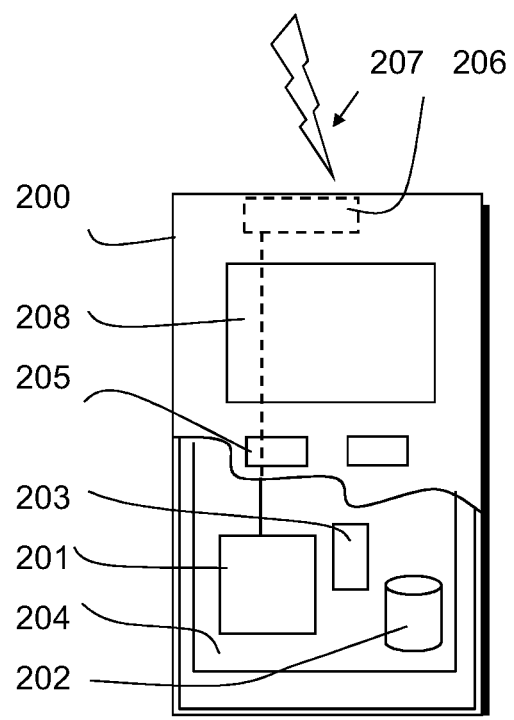
FIG. 3 shows a schematic diagram of an example mobile communication device.

A possible mobile communication device will now be described in more detail with reference to FIG. 3 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, voice over IP (VoIP) phones, portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), smart devices, wireless customer-premises equipment (CPE), or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The mobile device 200 may receive signals over an air or radio interface 207 via appropriate apparatus for receiving and may transmit signals via appropriate apparatus for transmitting radio signals. In FIG. 3 transceiver apparatus is designated schematically by block 206. The transceiver apparatus 206 may be provided for example by means of a radio part and associated antenna arrangement. The antenna arrangement may be arranged internally or externally to the mobile device.

Figure 4:
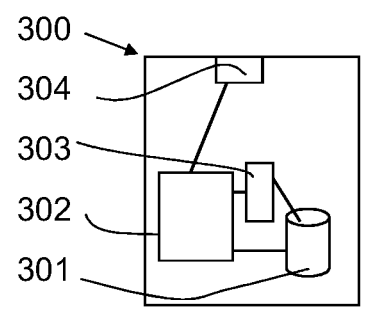
FIG. 4 shows a schematic diagram of an example control apparatus.

FIG. 4 shows an example of a control apparatus 300 for a communication system, for example to be coupled to and/or for controlling a station of an access system, such as a RAN node, e.g. a base station, eNB or gNB, a relay node or a core network node such as an MME or S-GW or P-GW, or a core network function such as AMF/SMF, or a server or host. The method may be implemented in a single control apparatus or across more than one control apparatus. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 300 can be arranged to provide control on communications in the service area of the system. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head.

3GPP has defined an architecture for the 5GC in TS 23.501. The architecture contains Service Communication Proxy (SCP) and Security Edge Protection Proxy (SEPP). SCP(s) and SEPP(s) may be used to interconnect other NFs. More information on related communication models is provided in Annex E of TS 23.501.

TS 23. 501 recognises that SEPPs and SCPs may be deployed in a distributed and redundant manner and that more than one SCP may be present in the communication path between NF Services. However, as per release 16, it is currently assumed that SCPs and SEPPs addresses are configured within the NF. It has not been specified how SCPs and SEPPs may be dynamically discovered and selected.

One proposal is that the SCP registers NF or NF set profiles on behalf of other NF.

One proposal suggested a new Nnrf_NextHop service, where the NRF can be queried with a target NF service (or instance) and location of the originating NF as input and returns a path to the destination of the target NF service (or instance) described by a list of SCP addresses as output.

This may require increased amounts of configured information (SCP paths between all NF service instances) in the NRF and may not take into account dynamic information. It assumes that the complete path is selected by the first SCP in the path for a certain communication request, although an SCP closer to the target may be more suited to select the NF (service) instance.

One alternative proposal suggested that information on the SCPs (e.g., whether the SCPs support of indirect communication and/or delegated discovery) may be provided to consumer NFs by the relevant NRF (e.g., at a slice-specific level) during the NF service registration. This may address the selection of the first SCP in a communication path (as an alternative to configured information, as currently suggested in the standards).

One alternative proposal suggested that information on the SCP serving an NF is stored in the NRF profile of that NF. This required that the target NF instance is selected before the SCP is selected, although an SCP closer to the target may be more suited to select the NF (service) instance. The possibility of more than two SCPs in the path is not addressed.

Figure 5:
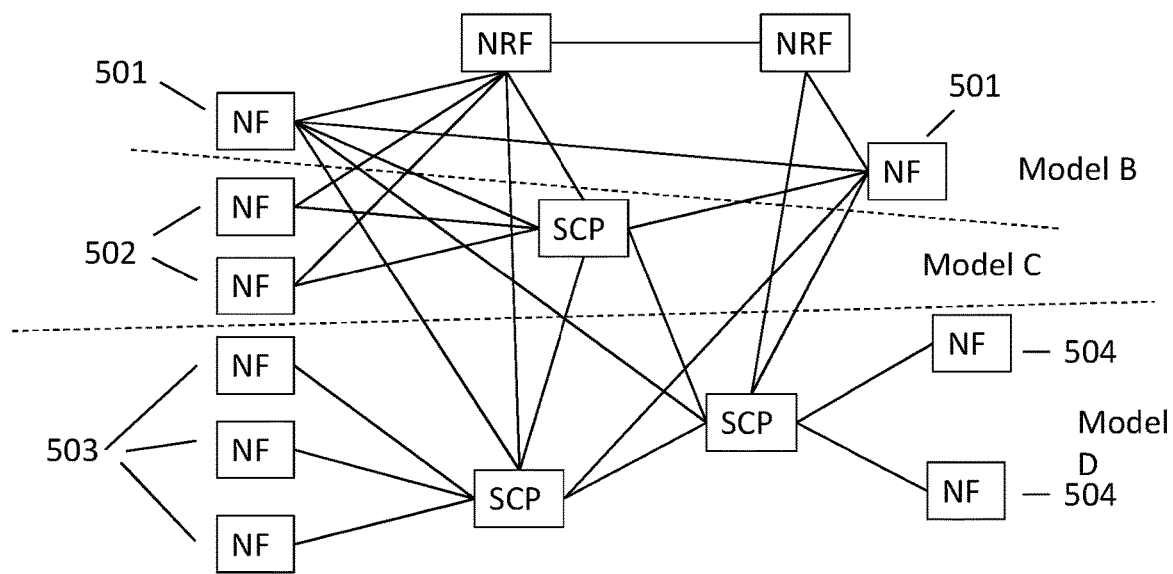
FIG. 5 shows a schematic diagram of NRF/SCP/NF deployment scenarios.

None of those proposal addresses all deployment scenarios in a satisfying manner:

FIG. 5 shows an example of several deployment models (such as defined in TS 23.501 annex E) which may coexist. The dashed lines delineate three models, Model B, Model C and Model D SCPs may be responsible for some dedicated (sets of) NFs (e.g., the sets 502, 503 and 504 of NFs), orange and blue clusters). Each SCP may be responsible for the "fine granular" distribution of load within the sets.

NFs may also be attached without dedicated SCP (such as NFs 501).

NRFs may be central or distributed. Stage 3 provides mechanisms for NRFs to redirect or forward subscriptions and discovery requests, and for registering NRF profiles at other NRFs.

There may be paths with more than two SCPs, e.g. backup connections (not depicted).

There may be a need for discovering an SCP based on more "coarse granular" criteria such as NF set and/or target location (user location and/or NF location).

Figure 6:
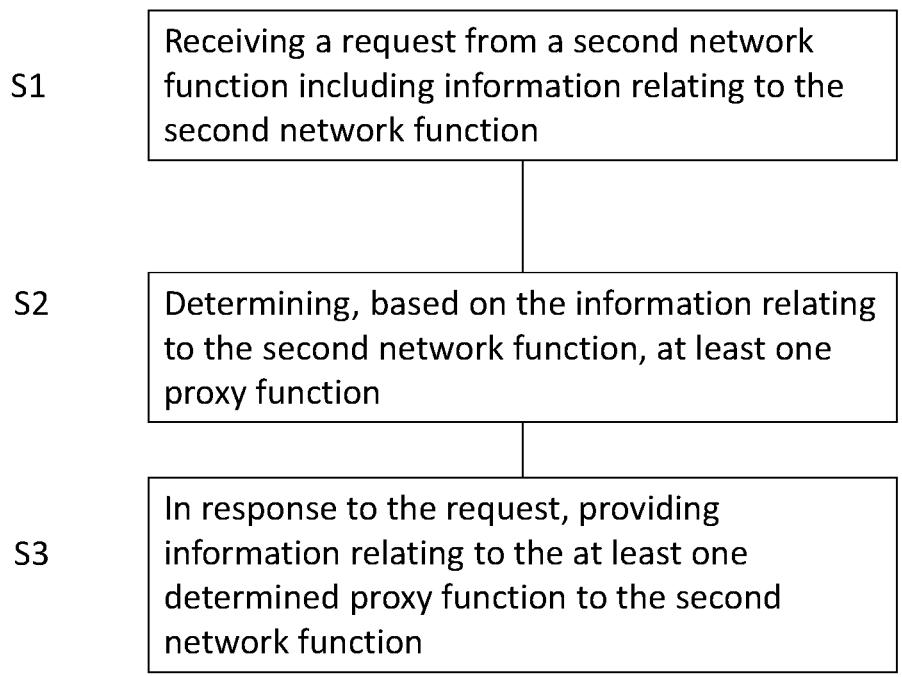
FIG. 6 shows a flowchart of a method according to an example embodiment.

FIG. 6 shows a flowchart of a method according to an example embodiment. The method may be performed at a first network function. The first network function may be an NRF.

In a first step, S1, the method comprises receiving a request from a second network function including information relating to the second network function.

In a second step, S2, the method comprises determining, based on the information relating to the second network function, at least one proxy function.

In a third step, S3, the method comprises, in response to the request, providing information relating to the at least one determined proxy function to the second network function.

Figure 7:
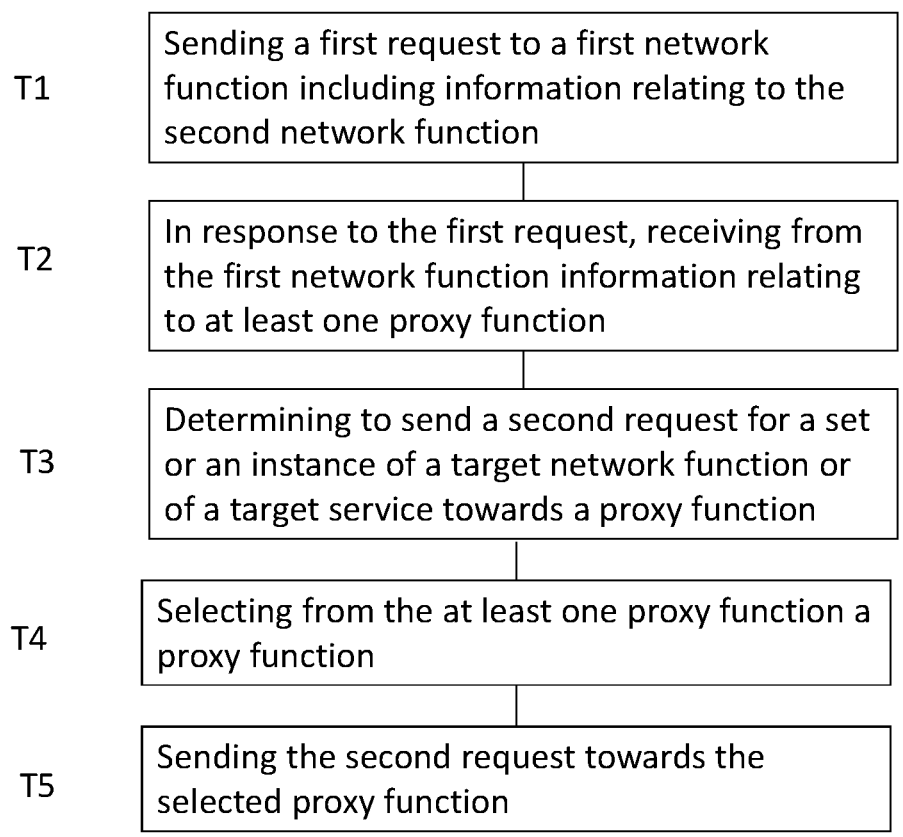
FIG. 7 shows a flowchart of a method according to an example embodiment.

FIG. 7 shows a flowchart of a method according to an example embodiment. The method may be performed at a second network function.

In a first step, T1, the method comprises sending a first request to a first network function including information related to the second network function.

In a second step, T2, the method comprises, in response to the first request, receiving from the first network function information relate to at least one proxy function.

In a third step, T3, the method comprises determining to send a second request for a set or an instance of a target network function or of a target service towards a proxy function.

In a fourth step, T4, the method comprises selecting from the at least one proxy function a proxy function.

In a fifth step, T5, the method comprises sending the second request towards the selected proxy function.

The second network function may be a Network Function instance, a service instance or a proxy function, such as a SCP.

The at least one proxy function may comprise at least one proxy function serving the second network function or at least one proxy function associated with a target network function or with a target service. The proxy function may comprise an SCP or a SEPP.

The information relating to the at least one determined proxy function may be referred to as a profile.

The method may comprise receiving, at the first network function, a registration request from the at least one proxy function comprising at least part of the information relating to the at least one proxy function and storing the information relating to the at least one proxy function.

In an example embodiment, the SCP registers its profile at the NRF. For example, when booting, the SCP registers its profile, possibly omitting some or all of the responsibility related parameters. Responsibility related parameters may also be configured per SCP ID in the NRF. The configured Responsibility related parameters in the NRF may also depend on querying network functions or their location.

The profile describing the SCP is stored in the NRF.

The information relating to the SCP may contain at least one of SCP address(es) or FQDNs, SCP ID and status up/down, heartbeat timer (used by NRF to check aliveness of SCP), priority, capacity, load, locality of SCP, deployment string to build the apiRoot of the SCP, features supported by the SCP and responsibility.

SCP responsibility may include at least one of service names of services provided by NFs served by the SCP, served Location(s) (encoded e.g. as service scope(s), or locality/ies as defined in TS 29.510), remote PLMN list (when the SCP is used to access egress SEPP(s) serving those PLMNs), list of remote NPN(s) (non-public networks) identified by their PLMN+NID (when the SCP is used to access egress SEPP(s) serving non-public networks), S-NSSAI(s) of the NFs served by the SCP (e.g. to support slice specific SCP), NSI lists of NFs served by the SCP (e.g. to support slice specific SCP), allowed NF types, allowed domains, NF sets served by the SCP (including, e.g., information about Service names, and Served Location per NF set), information about other SCPs and/or SEPPS reachable via the SCP and a flag marking the SCP as serving SCP.

The responsibility of the SCP may be configured information in the apparatus. The responsibility of the SCP may depend on the location of the second network function. The method may comprise storing different responsibility information for the SCP for different locations.

In an example embodiment, the SCP profile comprises at least information about SCP addresses. The profile may also contain information on the responsibility of the SCP, including at least one of served locations, and NF set(s) served by the SCP. This may facilitate dynamic discovery and selection of SCP.

The request from the second network function may be a request to discover at least one instances of sets of a target network function of a specific type or of a target service, and the at least one determined proxy function is a proxy function to address by the second network function for contacting the at least one instances of sets of the target network function or of the target service.

The response to the request may comprise information related to the at least one sets or instances of the target network function or of the target service, and the information related to the at least one proxy function comprises information that associates each at least one proxy function with one or more of the at least one sets or instances of the target network function or of the target service.

The request from the second network function may be a request to discover at least one proxy function. In one example embodiment, an NRF may return SCP profiles of SCPs that can be used to access an NF (service) (set) in response to discovery requests. Such discovery requests may have been initiated by a NF instance that is served by the given SCP or by a different SCP.

The method may comprise sending a registration request for the at least one proxy function including information relating to the at least one proxy functions to a third network function.

The method may comprise receiving, from a fourth network function, a registration request for at least one proxy function including information relating to the at least one proxy function and storing the information relating to the at least one proxy function.

The third network function and the fourth network function may be a NRF.

For example, when a NF is registering in the NRF, the NRF may return SCP profiles linked with the NF as a part of registration response.

The method may comprise receiving a registration or heartbeat request from a fifth network function, determining based on the stored responsibility information of an SCP that the SCP is serving the fifth network function, and providing information about the SCP in the reply to the registration or heartbeat. For example, the NRF may return SCP profiles linked with the NF in NRF responses during NF registration Update/Heart-Beat procedures. The registration request may be an initial registration or a registration update.

In an example embodiment, the SCP registers its profile at the NRF. For example, when booting, the SCP registers its profile, possibly omitting some or all of the responsibility related parameters. Responsibility related parameters may also be configured per locality of the SCP ID in the NRF. The configured Responsibility related parameters in the NRF may also depend on querying network functions or their location (locality).

When NFs boot and register with their NF set ID and/or location at an NRF, the NRF may select a stored SCP profile based on the NF set ID and/or location and provide corresponding SCP address(es) in the registration response. The NRF may also include SCP address(es) in heartbeat replies towards that NF.

For both messages (heartbeat replies or registration response), the absence of SCPs may be used as indication not to use local SCPs and perform NF discovery (following model B). This is not intended to overwrite consumers' configurations on which communication model to use, but if, for example, a consumer is configured to apply an indirect communication model (C or D) and has no information on which SCP to use then fallback to direct communication (e.g. model B) could take place.

The information relating to the second network function may comprise at least one of NF type, NF locality, the identity of the second network function and the network slice of the second network function. The network slice may refer to an S-NSSAI (i.e. slice/service type and slice differentiator) or a NSI (Network Slice Identifier).

For example, when an NRF handles a discovery request for an NF function or service, the NRF determines, based on the NF sending the discovery request, (for example based on the NF Type and locality of the NF sending the discovery) and based on comparing query parameters such as location, desired service, S-NSSAI/NSI, and target PLMN (+possibly NID) with responsibility information in SCP profiles, whether it returns one or a plurality of SCP profiles in the response to that discovery request. The SCP profile(s) may be added in addition to the standardized information in discovery request replies. The NRF may select the responsibility part of those SCP profiles taking into consideration the NF sending the discovery request or its location (as indicated in the NF profile of that NF). For instance, the NRF may include profiles of NF sets and for each NF set that is reachable via another SCP the SCP profile of that other SCP that indicates that the SCP is responsible for that NF set.

When receiving the NF discovery reply from the NRF, the NF service consumer or SCP that sent the related discovery request may then forward corresponding service requests to one SCP it selects from the obtained SCP profiles.

NF consumers, SCPs or SEPPs may also discover SCP profiles directly at the NRF by querying for SCPs and cache this information for handling subsequent service requests. The NRF may provide different responsibilities within the SCP profile depending on the location of the NF consumers or SCPs sending the discovery request. (For instance, for an NF consumer the NRF may always provide the profiles of the local SCP(s) and indicate that they are responsible for any location or service). The NF consumers or SCP then compares the desired service, location, target PMN, etc. with information in the SCP profile and decides based on that information whether to forward the service request to the corresponding SCP or send a discovery request to the NRF.

Both cases above, the NRF may indicate the SCP profile(s) of SCPs serving the NF service consumer in a reply to the discovery request by that NF service consumer (for Option C). This enables dynamic change of that SCP. The NRF may add a flag marking the SCP as serving SCP in the SCP profile. The NF service consumer sends all outgoing requests towards a serving SCP.

Alternatively, or in addition, the NRF may indicate SCP profiles of next-hop SCPs (associated with each target NF it provides) in a reply to the discovery request by that NF service consumer (for Option C). The NF service consumer may then indicate that next-hop SCP address or FQDN in a new HTTP header, e.g. 3gpp-Sbi-SCP-apiRoot, to avoid that the SCP serving the NF service consumer needs to send a discovery request to the NRF. If the signaling request goes through more than two SCPs, e.g. an SCP local to the consumer, an intermediate SCP and an SCP local to the producer, the 3gpp-Sbi-SCP-apiRoot header may include the list of all SCPs to go through or only the SCP local to the producer (i.e. last SCP).

An NRF may register the SCP profile at another NRF on behalf of the SCP. It may provide then a more coarse-grained description of the responsibility of the SCP.

In short, there is provided a two step selection process:
1) Step 1—selection of target set/SCP (happens in the Consumer in case of Model C, Consumer's SCP in case of Model D)
2) Step 2—selection of target instance (happens in the producer's SCP in case of both Model C and D).

When an SCP receives a request and forwards it to another SCP, it behaves as follows.

The second request may comprise an "authority" HTTP/2 pseudo-header field set to an address of the selected proxy function. The second request may comprise an apiRoot of a request URI set to the address of the selected proxy function. The address of the selected proxy function may be a FQDN or IP address. In one example embodiment, the SCP modifies the "authority" HTTP/2 pseudo-header field to the FQDN or IP address of the target SCP. It also sets the apiRoot of the request URI to the FQDN or IP address and optional deployment string (apiPrefix) of the target SCP.

The method may comprise receiving a service request for the target network function or for the target service and forwarding the service request as the second request.

The method may comprise receiving as part of the received service request a 3gpp-Sbi-Target-apiRoot header, and retaining 3gpp-Sbi-Target-apiRoot header in the second request. The SCP may forward some discovery headers (e.g. identifying the selected target NF set) and shall forward the 3gpp-Sbi-Target-apiRoot header if received in the request.

The second request may comprise a field indicating one or several proxy functions to be addressed as next hop by the selected proxy function. The method My comprise storing the selected network function to which the apparatus sends the second service request in combination with the 3gpp-Sbi-Target-apiRoot header value, and for sending subsequent received service request with the stored 3gpp-Sbi-Target-apiRoot header value toward the stored associated selected network function. As an example option, a new HTTP header, e.g. 3gpp-Sbi-SCP-apiRoot may indicate the next hop SCP FQDN or address if that has already been selected by the downstream NF or SCP. For instance, for communication model C the NF consumer may already select an NF set and responsible SCP to avoid that the first SCP needs to perform an NRF query and provide the next-hop SCP in that header. If that new HTTP header is received, the SCP modifies the "authority" HTTP/2 pseudo-header field to the FQDN or IP address of the target SCP. It also sets the apiRoot of the request Uniform Resource Identifier (URI) to the FQDN or IP address of the target SCP. If that new HTTP header is received, the SCP does not need to perform any NRF query to proxy the request.

The SCP may store the next hop SCP address in relation to the 3gpp-Sbi-Target-apiRoot header. The SCP forwards subsequent requests received without discovery parameters according to the 3gpp-Sbi-Target-apiRoot header, the Routing Binding Indication or the 3gpp-Sbi-SCP-apiRoot header, again modifying the apiRoot and the "authority" HTTP/2 pseudo-header as described above.

The method may comprise receiving, as part of the received service request, a field indicating the number of redirects by proxy functions. For example, an optional new HTTP header counting the redirects by SCPs may be used to detect loops. If the header is not yet present the SCP adds it with a start value, e.g. 1. If the header is already present, the SCP increments (or decrements) its value. If the SCP receives a request with this header exceeding a configured value, the SCP drops the request (i.e., does not send the request further), The SCP may log information about the dropped request to enable a subsequent network reconfiguration avoiding the detected loop.

In an example embodiment where the proxy function is a SEPP, a profile describing a SEPP may be stored in the NRF. The profile contains at least information about SEPP addresses. The profile may contain information on the PLMNs or SNPNs that can be reached through the SEPP.

When the proxy function is a SEPP, the request from the second network may comprise a discovery request. The NRF may return SEPP profiles of SEPP that can be used to access an NF (service) (set) in response to discovery requests by the NF instance that is served by the given SEPP.

The SEPP Profile may contain at least one of SEPP address(es) or FQDNs, SEPP ID and status up/down, PLMN ID(s)/NPN ID(s) (identified by PLMN ID+NID) accessible through the SEPP, heartbeat timer (used by NRF to check aliveness of SCP), priority, capacity, load sNssais/nsiList, features supported by the SEPP and locality.

In an example embodiment, when booting, a SEPP registers its SEPP profile. When the NRF handles a discovery request for NF function or service it decides whether it returns SEPP profiles of egress SEPPs by comparing query parameters such as target PLMN or target NPN with information in SEPP profiles and SCP profiles and possibly based on the NF function or SCP sending the discovery request. For instance, an NRF may return SCP profiles for the target PLMN or NPN if the egress SEPP is only reachable through those SCPs from the location of the querying NF, and egress SEPP profile(s) if the SEPP is directly reachable. The NF service consumer or SCP that sent the discovery request then forwards corresponding service requests to that SEPP.

NF consumers or SCPs may also discover SEPP profiles directly at the NRF and cache this information for handling subsequent service requests. The NF consumers or SCP then compares the desired target PLMN or NPN with information in the SEPP profile and decides based on that information whether to forward a service request to the corresponding egress SEPP or send a discovery request to the NRF.

When an SCP receives a request and forwards it to a SEPP, it behaves as follows.

The SCP modifies the "authority" HTTP/2 pseudo-header field to the FQDN or IP address of the target SEPP. It also sets the apiRoot of the request URI to the FQDN of the SEPP.

The SCP may forward some discovery headers (e.g. identifying the selected target NF set) and shall forward the target-apiRoot header if received in the request.

The method may comprise receiving as part of the received service request discovery parameters, selecting discovery parameters to be retained in the second service request if the apparatus selects to send the second request towards a proxy function, and removing the discovery parameters (from the header) if the apparatus selects not to send the second request towards a proxy function. The SCP may store the SEPP address in relation to the 3gpp-Sbi-Target-apiRoot header. If the SCP receives subsequent requests without discovery parameters and the same 3gpp-Sbi-Target-apiRoot header from the same originator, it forward those requests to the stored SEPP address, again modifying the apiRoot and the "authority" HTTP/2 pseudo-header as described above.

In the method as described above, an NRF may register the SEPP profile at another NRF on behalf of the SEPP.

A NF consumer is not required to configure the SCP or SEPP addresses statically, NRF can provide the SCP or SEPP addresses or profiles dynamically to NF consumer.

Any change in SCP or SEPP profiles (e.g., addresses) may be signalled towards the NF consumer dynamically (e.g. by consumers subscribing to changes of SCP and SEPP profiles or via heartbeat replies towards that NF).

Requests may be dynamically routed from HTTP client to HTTP server through one or more SCP and/or SEPP in the path (to support big and complex networks there could be more than 2 SCPs in the data path).

SCPs local to NFs can perform a fine granular selection of target NF instances and NF service instances based on load information obtained from those NFs and also handle overload.

An apparatus at a first network function may comprise means for receiving, a request from a second network function including information relating to the second network function, determining, based on the information relating to the second network function, at least one proxy function and, in response to the request, providing to the second network function information relating to the at least one determined proxy function.

Alternatively, or in addition, an apparatus at a second network function may comprise means for sending a first request to a first network function including information relating to the second network function, in response to the first request, receiving from the first network function information relate to at least one proxy function, determining to send a second request for a set or an instance of a target network function or of a target service towards a proxy function; selecting from the at least one proxy function a proxy function and sending the second request towards the selected proxy function.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus at a first network function comprising at least one processor and at least one memory including a computer program code, the at least one memory and computer program code configured to, with the at least one processor, cause the apparatus at least to:
    receive a request from a second network function including information relating to the second network function, wherein the request from the second network function is a request to discover at least one proxy function comprising at least a service communication proxy (SCP), and the information relating to the second network function comprises at least one of a type of the second network function, a location of the second network function, an identity of the second network function or a network slice of the second network function
    determine, based on the information relating to the second network function, at least one proxy function;
    receive a registration request from the at least one proxy function comprising at least information relating to the at least one proxy function, wherein the information relating to the proxy function comprises at least one of an SCP address, at least one fully qualified domain name, SCP identity and status, priority, capacity, load, location of SCP, deployment string for an application programming interface (API) root, responsibility of the SCP dependent on the location of the second network function, or features supported by the SCP;
    store the information relating to the at least one proxy function; and
    in response to the request, provide to the second network function information relating to the at least one determined proxy function.

2. An apparatus according to claim 1 wherein the request from the second network function is a request to discover at least one instance of sets of a target network function of a specific type or of a target service, and the at least one determined proxy function is a proxy function to address by the second network function for contacting at least one of the at least one instance of sets of the target network function or of the target service.

3. An apparatus according to claim 1, wherein at least one of the first network function is a network repository function.

4. An apparatus according to claim 1, wherein the responsibility of the SCP comprises at least one of Service names of services of network functions (NFs) served by the SCP, Served Location(s), service scope(s), location(s), Remote public land mobile network (PLMN) and/or non-public network identifiers, single-network slice selection assistance information (S-NSSAI(s)) and/or network slice identifier (NSI) lists of the NFs, NF types, Domains, NF sets served by the SCP, information about other SCPs and/or security edge protection proxies (SEPPS) reachable via the SCP, or information whether the SCP is the serving SCP of the second network function.

5. An apparatus according to claim 1, wherein the responsibility of the SCP is configured information in the apparatus.

6. An apparatus according to claim 1, wherein the responsibility of the SCP depends on the location of the second network function, and wherein the at least one memory and computer program code are further configured to, with the at least one processor, cause the apparatus to: store different responsibility information for the SCP for different locations.

7. An apparatus according to claim 1, wherein the at least one memory and computer program code are further configured to, with the at least one processor, cause the apparatus to: receive a registration or heartbeat request from a fifth network function, determine based on the stored responsibility information of an SCP that the SCP is serving the fifth network function, and provide information about the SCP in the reply to the registration or heartbeat request.

8. An apparatus according to claim 1, wherein the proxy function is a security edge protection proxy (SEPP), and wherein the information relating to the proxy function comprises at least one of at least one SEPP address, a fully qualified domain name, SEPP identity and status, at least one public land mobile network identity or non-public network accessible through the SEPP, heartbeat timer, priority, capacity, load, single-network slice selection assistance information (S-NSSAI(s)) and/or network slice identifier (NSI) list, features supported by the SEPP and location.

9. An apparatus according to claim 8, wherein the SEPP is located in the same network as the second network function and a target network function or the target service is located in another network accessible through the SEPP.

10. An apparatus at a second network function comprising at least one processor and at least one memory including a computer program code, the at least one memory and computer program code configured to, with the at least one processor, cause the apparatus at least to:
send a first request to a first network function including information relating to the second network function, wherein the information relating to the second network function comprises at least one of a type of the second network function, a location of the second network function, an identity of the second network function or a network slice of the second network function;
in response to the first request, receive from the first network function, information relating to at least one proxy function comprising at least a service communication proxy (SCP), wherein the information relating to the proxy function comprises at least one of an SCP address, at least one fully qualified domain name, SCP identity and status, priority, capacity, load, location of SCP, deployment string for an application programming interface (API) root, responsibility of the SCP dependent on the location of the second network function, or features supported by the SCP;
determine to send a second request for a set or an instance of a target network function or of a target service towards a proxy function;
select from the at least one proxy function a proxy function; and
send the second request towards the selected proxy function.

11. An apparatus according to claim 10 wherein the first request is a request to discover at least one instance of sets of a target network function of a specific type or of a target service, and the at least one proxy function is a proxy function to address by the second network function for contacting the at least one instance of sets of the target network function or of the target service.

12. An apparatus according to claim 11, wherein the response to the first request comprises information relating to at least one set or instance of the target network function or of the target service, and the information relating to the at least one proxy function comprises information that associates each proxy function with at least one of the one or several sets or instances of the target network function or of the target service.

13. An apparatus according to claim 10, wherein the first network function is a network repository function.

14. An apparatus according to claim 10, wherein the second network function comprises a network function instance or a service instance.

15. A method comprising, at a first network function:
receiving a request from a second network function including information relating to the second network function, wherein the request from the second network function is a request to discover at least one proxy function comprising at least a service communication proxy (SCP), and the information relating to the second network function comprises at least one of a type of the second network function, a location of the second network function, an identity of the second network function and a network slice of the second network function;
determining, based on the information relating to the second network function, at least one proxy function;
receiving a registration request from the at least one proxy function comprising information relating to the at least one proxy function, wherein the information relating to the proxy function comprises at least one of an SCP address, at least one fully qualified domain name, SCP identity and status, priority, capacity, load, location of SCP, deployment string for an application programming interface (API) root, responsibility of the SCP dependent on the location of the second network function, or features supported by the SCP;
storing the information relating to the at least one proxy function; and
in response to the request, providing to the second network function information relating to the at least one determined proxy function.

16. A method according to claim 15 wherein the request from the second network function is a request to discover at least one instance of sets of a target network function of a specific type or of a target service, and the at least one determined proxy function is a proxy function to address by the second network function for contacting at least one of the at least one instance of sets of the target network function or of the target service.

17. A non-transitory computer readable medium comprising program instructions for causing an apparatus at a first network function to perform:
receive a request from a second network function including information relating to the second network function, wherein the request from the second network function is a request to discover at least one proxy function comprising at least a service communication proxy (SCP), and the information relating to the second network function comprises at least one of a type of the second network function, a location of the second network function, an identity of the second network function or a network slice of the second network function
determine, based on the information relating to the second network function, at least one proxy function;
receive a registration request from the at least one proxy function comprising at least information relating to the at least one proxy function, wherein the information relating to the proxy function comprises at least one of an SCP address, at least one fully qualified domain name, SCP identity and status, priority, capacity, load, location of SCP, deployment string for an application programming interface (API) root, responsibility of the SCP dependent on the location of the second network function, or features supported by the SCP;
store the information relating to the at least one proxy function; and
in response to the request, provide to the second network function information relating to the at least one determined proxy function.

18. A method comprising, at a second network function:
sending a first request to a first network function including information relating to the second network function, wherein the information relating to the second network function comprises at least one of a type of the second network function, a location of the second network function, an identity of the second network function or a network slice of the second network function;
in response to the first request, receiving from the first network function, information relating to at least one proxy function comprising at least a service communication proxy (SCP), wherein the information relating to the proxy function comprises at least one of an SCP address, at least one fully qualified domain name, SCP identity and status, priority, capacity, load, location of SCP, deployment string for an application programming interface (API) root, responsibility of the SCP dependent on the location of the second network function, or features supported by the SCP;

determining to send a second request for a set or an instance of a target network function or of a target service towards a proxy function;

selecting from the at least one proxy function a proxy function; and sending the second request towards the selected proxy function.

19. A non-transitory computer readable medium comprising program instructions for causing an apparatus at a second network function to perform:

send a first request to a first network function including information relating to the second network function, wherein the information relating to the second network function comprises at least one of a type of the second network function, a location of the second network function, an identity of the second network function or a network slice of the second network function;

in response to the first request, receive from the first network function information relating to at least one proxy function comprising at least a service communication proxy (SCP), wherein the first network information relating to the proxy function comprises at least one of an SCP address, at least one fully qualified domain name, SCP identity and status, priority, capacity, load, location of SCP, deployment string for an application programming interface (API) root, responsibility of the SCP dependent on the location of the second network function, or features supported by the SCP;

determine to send a second request for a set or an instance of a target network function or of a target service towards a proxy function;

select from the at least one proxy function a proxy function; and send the second request towards the selected proxy function.

* * * * *